United States Patent
Hough et al.

(10) Patent No.: US 7,789,160 B2
(45) Date of Patent: Sep. 7, 2010

(54) ADDITION OF NONIONIC SURFACTANTS TO WATER SOLUBLE BLOCK COPOLYMERS TO INCREASE THE STABILITY OF THE COPOLYMER IN AQUEOUS SOLUTIONS CONTAINING SALT AND/OR SURFACTANTS

(75) Inventors: Lawrence Alan Hough, Philadelphia, PA (US); Gilda Maria Lizarraga, Cranbury, NJ (US); Herve Adam, Princeton, NJ (US); Jean-Christophe Castaing, Burlington, NJ (US); Subramanian Kesavan, East Windsor, NJ (US)

(73) Assignee: Rhodia Inc., Cranbury, NJ (US)

( * ) Notice: Subject to any disclaimer, the term of this patent is extended or adjusted under 35 U.S.C. 154(b) by 48 days.

(21) Appl. No.: 12/253,934

(22) Filed: Oct. 17, 2008

(65) Prior Publication Data

US 2009/0107681 A1   Apr. 30, 2009

Related U.S. Application Data

(60) Provisional application No. 60/984,172, filed on Oct. 31, 2007.

(51) Int. Cl.
E21B 43/22 (2006.01)
E21B 43/26 (2006.01)

(52) U.S. Cl. .................. 166/371; 166/300; 166/308.3; 507/277

(58) Field of Classification Search .................. None
See application file for complete search history.

(56) References Cited

U.S. PATENT DOCUMENTS

| | | | |
|---|---|---|---|
| 4,222,881 A | 9/1980 | Byham et al. |
| 4,241,951 A | 12/1980 | Hard |
| 4,432,881 A | 2/1984 | Evani |
| 4,541,935 A | 9/1985 | Constien et al. |
| 4,556,495 A | 12/1985 | Shaw |
| 4,615,825 A | 10/1986 | Teot et al. |
| 4,617,995 A | 10/1986 | Lau |
| 4,725,372 A | 2/1988 | Teot et al. |
| 4,735,731 A | 4/1988 | Rose et al. |
| 4,814,096 A | 3/1989 | Evani |
| 5,099,923 A | 3/1992 | Aften et al. |
| 5,152,906 A | 10/1992 | Aften et al. |
| 5,283,306 A | 2/1994 | Ramesh et al. |
| 5,342,530 A | 8/1994 | Aften |
| 5,510,306 A | 4/1996 | Murray |
| 5,551,516 A | 9/1996 | Norman et al. |
| 5,566,760 A | 10/1996 | Harris |
| 5,573,709 A | 11/1996 | Wells |
| 5,603,841 A | 2/1997 | Kerr |
| 5,648,584 A | 7/1997 | Murray |
| 5,648,585 A | 7/1997 | Murray et al. |
| 5,763,548 A | 6/1998 | Matyjaszewski et al. |
| 5,849,960 A | 12/1998 | Singleton et al. |
| 5,964,295 A | 10/1999 | Brown et al. |
| 5,965,502 A | 10/1999 | Balzer |
| 5,979,555 A | 11/1999 | Gadberry et al. |
| 6,077,887 A | 6/2000 | Thuresson |
| 6,150,222 A | 11/2000 | Gardner et al. |
| 6,153,705 A | 11/2000 | Corpart et al. |
| 6,222,077 B1 | 4/2001 | Singleton |
| 6,232,274 B1 | 5/2001 | Hughes et al. |
| 6,262,206 B1 | 7/2001 | Nesvadba et al. |
| 6,407,187 B1 | 6/2002 | Matyjaszewski et al. |
| 6,642,318 B1 | 11/2003 | Moad et al. |
| 6,747,111 B2 | 6/2004 | Chiefari et al. |
| 6,908,888 B2 | 6/2005 | Lee et al. |
| 7,115,546 B2 | 10/2006 | Qu et al. |
| 7,144,844 B2 | 12/2006 | Qu et al. |
| 7,157,409 B2 | 1/2007 | Horton et al. |
| 7,183,239 B2 | 2/2007 | Smith et al. |
| 7,279,446 B2 | 10/2007 | Colaco et al. |
| 7,287,593 B2 | 10/2007 | Hutchins et al. |
| 7,351,681 B2 * | 4/2008 | Reddy et al. ................. 507/219 |
| 2001/0020531 A1 | 9/2001 | Varadaraj et al. |
| 2002/0161087 A1 | 10/2002 | Heitz et al. |
| 2003/0134751 A1 | 7/2003 | Lee et al. |
| 2005/0107503 A1 | 5/2005 | Couillet et al. |
| 2006/0128597 A1 | 6/2006 | Chen et al. |
| 2008/0119374 A1 * | 5/2008 | Willberg et al. ............. 507/209 |

(Continued)

FOREIGN PATENT DOCUMENTS

CA    1298697    4/1992

(Continued)

OTHER PUBLICATIONS

Written Opinion of the International Searching Authority in International Application No. PCT/US2008/080399 mailed Apr. 28, 2009, (8 pages).

(Continued)

*Primary Examiner*—Zakiya W. Bates
(74) *Attorney, Agent, or Firm*—Novak, Druce + Quigg LLP

(57) ABSTRACT

An aqueous fluid useful for the recovery of crude oil from a subterranean formation, which includes a composition including a mixture of water, a water soluble block copolymer, an inorganic salt and at least one member of the group of a nonionic surfactant having an HLB of less than 12, and methods for using same.

15 Claims, 1 Drawing Sheet

U.S. PATENT DOCUMENTS

2009/0111716 A1 4/2009 Hough et al.

FOREIGN PATENT DOCUMENTS

| | | |
|---|---|---|
| WO | 8701758 | 3/1987 |
| WO | 9630421 | 10/1996 |
| WO | 9701478 | 1/1997 |
| WO | 9856497 | 12/1998 |
| WO | 9858974 | 12/1998 |
| WO | 9903894 | 1/1999 |
| WO | 9931144 | 6/1999 |
| WO | 2009058589 A3 | 5/2009 |
| WO | 2009058590 A3 | 5/2009 |

OTHER PUBLICATIONS

Written Opinion of the International Searching Authority in International Application No. PCT/US2008/080396 mailed Apr. 28, 2009, (8 pages).

* cited by examiner

ADDITION OF NONIONIC SURFACTANTS TO WATER SOLUBLE BLOCK COPOLYMERS TO INCREASE THE STABILITY OF THE COPOLYMER IN AQUEOUS SOLUTIONS CONTAINING SALT AND/OR SURFACTANTS

CROSS-REFERENCE TO RELATED APPLICATIONS

This claims the benefit of U.S. provisional patent application No. 60/984,172 filed Oct. 31, 2007 incorporated herein by reference.

FIELD OF THE INVENTION

This invention relates to a blend of a nonionic surfactant and an aqueous solution containing a water soluble block copolymer and having a molecular weight from 5000 to 1,000,000 g/mol. The nonionic surfactant increases the polymer's resistance to salt and/or surfactant. The invention can assist in recovering hydrocarbon from a subterranean formation as well as other uses. For example, the compositions can be used in fluids for hydraulic fracturing of subterranean formations or fluids used in chemical flooding of subterranean formations.

BACKGROUND OF THE INVENTION

To recover hydrocarbons from hydrocarbon-bearing subterranean geologic formations a wellbore is drilled into the formation to provide a flow path for the hydrocarbons from a reservoir within the formation to the surface. However, often a stimulation technique referred to as hydraulic fracturing is needed to improve the flow path and recovery of the hydrocarbon from oil or gas wells.

In hydraulic fracturing a specialized fluid is pumped into the targeted formation at a rate in excess of what can be dissipated through the natural permeability of the formation rock. The specialized fluids used in the technique are referred to fracturing fluids. The fluids result in a pressure build up until such pressure exceeds the strength of the formation rock. When this occurs, the formation rock fails and a so-called "fracture" is initiated. With continued pumping, the fracture grows in length, width and height. The fracture, which is generated by the application of this stimulation technique, creates a conductive path to the wellbore for the hydrocarbon.

Ideally, fracturing fluids should impart a minimal pressure drop in the pipe within the wellbore during placement and have an adequate viscosity to carry proppant material that prevents the fracture from closing. Moreover, the fracturing fluids should have a minimal leak-off rate to avoid fluid migration into the formation rocks so that, notably, the fracture can be created and propagated and should degrade so as not to leave residual material that may prevent accurate hydrocarbons to flow into the wellbore.

Typical aqueous fracturing fluids mainly consisting of "linear" polymeric gels comprising guar, guar derivatives or hydroxyethyl cellulose were introduced to attain a sufficient fluid viscosity and thermal stability in high temperature reservoirs, linear polymer gels were partially replaced by cross-linked polymer gels such as those crosslinked with borate, zirconate or titanate ions. However, as it became apparent that crosslinked polymer gel residues might damage the permeability of hydrocarbon bearing formations, fluids with a lower polymer content and foamed fluids were introduced. Also, methods were introduced to improve the clean-up of polymer-based fracturing fluids. These included advanced viscosity breaker technology in which the introduction of certain components to a fracturing fluid can cause a dramatic decrease in the fluid viscosity, called "breaking". Breaking can also occur by varying the amount of water or electrolyte or other components that may already be present in the fluid. For example, in oilfield applications, the viscosity of fracturing fluids is reduced or lost upon exposure to formation fluids (e.g., crude oil, condensate and/or water). The viscosity reduction effectuates cleanup of the reservoir, fracture, or other treated area.

A number of polymer-free aqueous fracturing fluids are based on viscoelastic surfactants. The principal advantages of viscoelastic surfactant fluids are ease of preparation, minimal formation damage and high retained permeability in the proppant pack. Viscoelastic surfactant fluids are disclosed, for example, in U.S. Pat. Nos. 4,615,825, 4,725,372, 4,735,731, CA-1298697, U.S. Pat. Nos. 5,551,516, 5,964,295, 5,979,555 and 6,232,274. One well-known polymer-free aqueous fracturing fluid comprising a viscoelastic surfactant, which has been commercialized by the company group Schlumberger under the trademark ClearFRAC, and a mixture of a quaternary ammonium salt, the N-erucyl-N,N-bis(2-hydroxyethyl)-N-methyl ammonium chloride, with isopropanol and brine, the brine preferably including 3% by weight of ammonium chloride and 4% by weight of potassium chloride.

Published PCT application WO 87/01758 entitled "Hydraulic Fracturing Process and Compositions" discloses fracturing processes which use aqueous hydraulic fracturing fluids. The fluids comprise: (a) an aqueous medium, and (b) a thickening amount of a thickener composition comprising (i) a water-soluble or water-dispersible interpolymer having pendant hydrophobic groups chemically bonded thereto, (ii) a nonionic surfactant having a hydrophobic group(s) that is capable of associating with the hydrophobic groups on said organic polymer, and (iii) a water-soluble electrolyte. Additionally, the fluids preferably contain a stabilizing amount of a thiosulfate salt. As an example, an interpolymer of acrylamide and dodecyl acrylate was used in combination with a nonionic surfactant (HLB of from 10 to 14) to thicken a dilute aqueous solution of KCl and sodium thiosulfate; the aqueous solution had excellent properties for use as a high temperature hydraulic fracturing fluid.

U.S. Pat. No. 4,432,881 entitled "Water-Dispersible Hydrophobic Thickening Agent" discloses an aqueous liquid medium having increased low shear viscosity as provided by dispersing into the aqueous medium (1) a water-soluble polymer having pendant hydrophobic groups, e.g., an acrylamide dodecyl acrylate copolymer, and (2) a water-dispersible surfactant, e.g., sodium oleate, or dodecyl polyethyleneoxy glycol monoether. The thickened aqueous medium is suitably employed in applications requiring viscous liquids which retain their viscosity when subjected to shear, heat or high electrolyte (salt) concentrations. Such applications include uses in oil recovery processes, as fluid mobility control agents, fracturing fluids and drilling muds, as well as hydraulic fluids and lubricants in many applications.

Also, U.S. Pat. No. 5,566,760 entitled "Method of Using a Foamed Fracturing Fluid" discloses a fracturing fluid comprising surfactants and hydrophobically-modified polymers. In these fluids, surfactant molecules form the interface between gas bubbles and the polymer molecules that form a polymeric network similar to those of the pure polymeric fluids. Still, there is no mention of viscoelastic surfactants or of the responsiveness of the fluids to hydrocarbons.

United States Patent Application Publication 2003/0134751 discloses addition of polymers to a viscoelastic surfactant base system allows adjusting the rheological properties of the base fluid. The polymer can perform different functions (breaker, viscosity enhancer, or viscosity recovery enhancer) depending upon its molecular weight and concentration in the fluid. The methods and compositions are presented for adjusting the viscosity of viscoelastic surfactant fluids based on anionic, cationic, nonionic and zwitterionic surfactants.

United States Patent Application Publication 2005/0107503 A1 describes an aqueous viscoelastic fracturing fluid for use in the recovery of hydrocarbons. The fluid comprises a viscoelastic surfactant and a hydrophobically modified polymer. The viscoelastic surfactant is usually ionic. It may be cationic, anionic or zwitterionic depending on the charge of its head group.

A problem in using water-soluble polymers, such as polyelectrolyte and hydrophobically modified polyelectrolyte polymers, to modify the viscosity of fracturing fluids is that polyelectrolyte and hydrophobically modified polyelectrolyte polymers typically have a low resistance to salt. Salt typically causes a breakdown in the viscosity and stability of these polymers in aqueous solutions. In addition, the viscosity of hydrophobically modified polyelectrolyte polymers typically breaks down in the presence of surfactants.

It would be desirable to use such water soluble polymers to increase viscosity of fracturing fluids in subterranean formations, such as natural gas and/or oil fields, if this viscosity breakdown could be controlled. This breakdown is also disadvantageous in a number of other environments in which such water soluble polymers would otherwise be useful, such as personal care products or as fluid loss agents for cement.

In addition to fracturing, other techniques may be employed to further improve hydrocarbon recovery from subterranean formations. Initially, oil is produced from the fractured formation by pressure depletion (primary recovery). In this method, the differential pressure between the formation and a production well or wells forces the oil contained within the formation toward a production well where it can be recovered. Traditionally secondary recovery processes through injection of water or gas are used to displace additional oil toward producing wells. Typically, up to about 35 percent of the oil which is initially contained in a formation can be recovered in average through primary and secondary recovery. This leaves a large quantity of oil within the formation. Additionally, some formations contain oil which is too viscous to be efficiently recovered from the formation using primary and secondary processes. Because of the need to recover a larger percentage of the oil from a formation, methods have been developed to recover oil which could not be recovered using only pressure depletion techniques. These methods are typically referred to as "enhanced oil recovery techniques" (EOR).

Among the more promising of the methods being used today is an enhanced oil recovery process referred to as chemical flooding which generally covers the use of polymer and/or surfactant slugs. In polymer flooding, a polymer solution is injected to displace oil toward producing wells. The polymer solution is designed to develop a favorable mobility ratio between the injected polymer solution and the oil/water bank being displaced ahead of the polymer. However, the use of polymer is not always satisfactory as many polymer solutions are sensitive to brine type and concentration which can affect the apparent viscosity of the solution. In surfactant flooding, an aqueous solution containing surfactant is injected into the oil rich formation. Residual oil drops are deformed as a result of low Interfacial Tension provided by surfactant solution and drops are displaced through the pore throats and displaced oil is the recovered.

SUMMARY OF THE INVENTION

Figure 1:
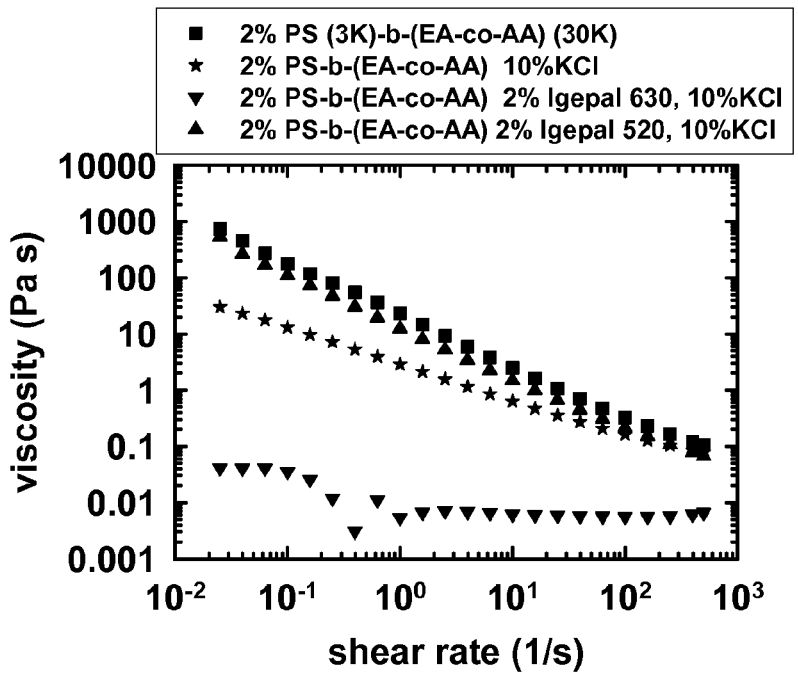
FIG. 1 shows the viscosity as a function of shear rate for a 2% 2% PS (3K)-b-(EA-co-AA) (30K) diblock solution in 10% KCl, at 2 wt % IGEPAL nonionic surfactant (ethoxylated octylphenol) of the example.

The composition of the present invention comprises a mixture of water, a water soluble block copolymer and at least one nonionic surfactant, wherein the composition has 0.05 to 10 wt % water soluble block copolymer, 0.01 to 10 wt % surfactant on a wet basis, and inorganic salt containing mono- and/or di-valent and/or tri-valent ions from about 0.01 to about 20 wt %. The water soluble block copolymer can be charged or uncharged.

Some uses of the composition of the present invention include, thickening agents for home care products, liquid laundry detergents, drain cleaners, hard surface cleaners, automatic dishwasher fluids, fracturing fluids in oil and gas fields, enhanced oil recovery fluids, hydraulic fracturing fluids, thickening hair gels, gel deodorant, and other personal care applications, as well as a fluid loss agent in cement, gas field and/or oil field applications. The invention is particularly relevant for chemical flooding in enhanced oil recovery (EOR). It targets more precisely the improvement of electrolytic stability of polymeric solutions. The invention improves performance of polymer slugs (also called mobility control agents). The polymer slug can be used alone or can be combined with surfactant for example, when used for surfactant-polymer flooding or alkaline surfactant-polymer flooding.

For example, the present aqueous fluid is useful to aid in the recovery of hydrocarbons from a subterranean formation. If desired the fracturing fluid composition comprises a mixture of brine, the water soluble polymer, and at least one member of the group consisting of a nonionic surfactant, wherein the water soluble block copolymer has a concentration of 0.05 to 20 weight % on a wet basis.

The present compositions contain little or no anionic surfactant. Preferably there is less than 0.5 wt. %, more preferably less than 0.3 wt. %, anionic surfactant on a wet basis.

The addition of the nonionic surfactant results in the protection or recovery of the viscosity and/or the viscoelastic properties of water soluble block copolymers in the presence of salt. The amount of salt varies depending on the use. Typically, the addition of this surfactant can assist in the protection or recovery of the viscosity and/or the viscoelastic properties of water soluble polymers in the presence of 1 to 20% of mono or divalent salts.

The present invention overcomes a limitation of aqueous solutions containing water soluble polymers, for example, polyelectrolyte and\or hydrophobically modified polyelectrolyte polymers, namely their poor resistance to salts. The addition of the nonionic surfactant provides a resistance to salts and surfactants as measured by rheology. A full recovery of the viscosity is observed with the addition of the nonionic surfactant.

Unless otherwise indicated all percents relating to composition are weight percents and all average molecular weights are weight average molecular weights.

As used herein, the notation "($C_n$-$C_m$)" in reference to an organic group or compound, wherein n and m are integers, means that the group or compound contains from n to m carbon atoms per such group or compound.

As used herein, the term "alkyl" means a monovalent saturated straight chain or branched hydrocarbon radical, typically a monovalent saturated ($C_1$-$C_{30}$)hydrocarbon radical, such as for example, methyl, ethyl, n-propyl, iso-propyl, n-butyl, sec-butyl, t-butyl, pentyl, or n-hexyl, which may optionally be substituted on one or more of the carbon atoms of the radical. In one embodiment, an alkyl radical is substituted on one or more carbon atoms of the radical with alkoxy, amino, halo, carboxy, or phosphono, such as, for example, hydroxymethyl hydroxyethyl, methoxymethyl, ethoxymethyl, isopropoxyethyl, aminomethyl, chloromethyl or trichloromethyl, carboxyethyl, or phosphonomethyl.

As used herein, the term "hydroxyalkyl" means an alkyl radical that is substituted on one of its carbon atoms with a hydroxyl group, such as As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "cyclcoalkyl" means a saturated cyclic hydrocarbon radical, typically a ($C_3$-$C_8$) saturated cyclic hydrocarbon radical, such as, for example, cyclohexyl or cyclooctyl, which may optionally be substituted on one or more of the carbon atoms of the radical.

As used herein, the term "alkenyl" means an unsaturated straight chain, branched chain, or cyclic hydrocarbon radical that contains one or more carbon-carbon double bonds, such as, for example, ethenyl, 1-propenyl, or 2-propenyl, which may optionally be substituted on one or more of the carbon atoms of the radical.

As used herein, the term "aryl" means a monovalent unsaturated hydrocarbon radical containing one or more six-membered carbon rings in which the unsaturation may be represented by three conjugated double bonds, such as for example, phenyl, naphthyl, anthryl, phenanthryl, or biphenyl, which may optionally be substituted one or more of carbons of the ring. In one embodiment, an aryl radical is substituted on one or more carbon atoms of the radical with hydroxyl, alkenyl, halo, haloalkyl, or amino, such as, for example, methylphenyl, dimethylphenyl, hydroxyphenyl, chlorophenyl, trichloromethylphenyl, or aminophenyl.

As used herein, the term "aryloxy" means an oxy radical that is substituted with an aryl group, such as for example, phenyloxy, methylphenyl oxy, isopropylmethylphenyloxy.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, alkenyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

DETAILED DESCRIPTION OF THE INVENTION

The composition of the present invention comprises a mixture of water, a water soluble block co-polymer, and a non-ionic surfactant and inorganic salt containing mono- and/or di-valent and/or trivalent ions.

The preferred compositions of the present invention contain a mixture of water, a water soluble block co-polymer, inorganic salt and nonionic surfactants and are essentially free of anionic surfactants.

The relative amounts of the above-named components in the composition can be varied. Typically the composition has 0.05 to 20 wt % water soluble block copolymer, 0.01 to 10 wt % nonionic surfactant, and 0.1 to 20 wt % inorganic salt containing mono- and/or di-valent and/or trivalent ions on a wet basis. The water-soluble mono- and/or di-valent electrolyte is typically used in amounts of from about 1 weight percent to about 15 weight percent, or about 1 to 10 weight percent, of the aqueous composition, based on weight of aqueous composition (a wet basis).

The relative amounts of the above-named components in the composition can be varied. However, typical ranges for water soluble block copolymer and nonionic surfactant of the overall compositions of embodiments of the present invention on a wet basis are listed in TABLE 1.

TABLE 1

| | Water Soluble Block Polymer (wt. % wet basis) | Nonionic Surfactant (wt. % wet basis) | Inorganic Salt |
|---|---|---|---|
| Weight Percent (Broad) | 0.05-20 | 0.01-10 | 0.1 to 20 |
| Weight Percent (Preferred) | 0.1-10 | 0.08-3 | |
| Weight Percent (More Preferred) | 0.3-3 | 0.1-2 | |
| Polymer Weight Average Molecular Weight (Broad) | 5000 g/mol-1,000,000 g/mol | | |
| Polymer Weight Average Molecular Weight (Preferred) | 10000 g/mol-200,000 g/mol | | |
| HLB (Broad) | | 1-12 | |
| HLB (Preferred) | | 2-10 | |
| HLB (More Preferred) | | 6-10 | |

The water-soluble inorganic salt contains mono- and/or di-valent and/or trivalent ions. Inorganic salt concentration is typically used in amounts of from about 0.01 weight percent to about 20 weight percent or about 1 weight percent to about 15 weight percent, based on weight of aqueous medium, for example in amounts of from about 1 to 10 weight percent.

I. Water Soluble Block Copolymers

The water soluble block copolymers comprise at least one block water-soluble in nature and containing hydrophobic units and at least one block predominantly hydrophobic in nature. Information about these block copolymers is provided by US Patent Application Publication No. 2002/0161087 A1 to Heitz et al. incorporated herein by reference in its entirety. For example, the water soluble block copolymers may be di-block copolymers, tri-block copolymers, comb copolymers or random-block copolymers.

According to a first embodiment, the copolymer contains only a single hydrophobic block and a single water-soluble block. According to another embodiment, the copolymer contains a water-soluble block having a hydrophobic group at each end or the copolymer contains a hydrophobic block having a water-soluble group at each end.

In the description which follows, the expression "block water-soluble in nature" should be understood to mean a polymer block containing a number of hydrophilic groups sufficient to obtain a water soluble block well dissolved in water. Solubility in water of the water soluble block means a block copolymer containing such a water soluble block, when mixed with water, gives a translucent monophasic system. Usually such a translucent monophasic system is obtained from a water soluble block comprising at least 30%, preferably at least 50% by weight of hydrophilic units with respect to the totality of units of the water-soluble block. The block water-soluble in nature is therefore soluble in water.

The term "unit" should be understood to mean that part of the block corresponding to a monomeric unit.

Likewise, the expression "block predominantly hydrophobic in nature" should be understood to mean a polymer block preferably containing at least 67% by weight hydrophobic units with respect to the totality of units. The block predominantly hydrophobic in nature is not soluble in water. This block copolymer containing at least one block water-soluble in nature and at least one block predominantly hydrophobic in nature forms a viscoelastic gel when it is in solution in water.

The term "viscoelastic gel" should be understood to mean a liquid medium for which the viscous modulus $G''$ and the elastic modulus $G'$ are such that $G'>G''$. This gel behavior is manifested by a flow threshold and even, in some cases, by a shear-thickening effect (an increase in the viscosity with flow). This gel effect is obtained when the polymer concentration exceeds a certain threshold called the critical gelling concentration.

The block copolymers have the advantage of making the aqueous media viscoelastic when they are used in only a small amount with respect to the aqueous medium. The copolymer may be used at a concentration from about 0.05 to 10% by weight of aqueous composition, typically 0.1 to 4 wt. % or 0.3 to 2 wt. %. For example, in hydraulic fluid the copolymer may be used at a concentration higher than 0.1% by weight, more particularly between 0.5 and 10% by weight and even more preferably at a concentration from 1 to 5% by weight.

According to one embodiment of the water soluble block copolymers, the weight ratio of the block water-soluble in nature to the completely hydrophobic block is between 95/5 and 20/80, even more preferably between 90/10 and 40/60.

According to a first version of the preparation of the water soluble block copolymers, the blocks water-soluble in nature and the blocks predominantly hydrophobic in nature of the above copolymers may come from the copolymerization of hydrophilic and hydrophobic monomers. The amounts of hydrophilic and hydrophobic units in each of the blocks can then be controlled by the respective contents of hydrophilic monomers and hydrophobic monomers during the polymerization of the blocks.

Thus, the blocks predominantly hydrophobic in nature may come from the copolymerization of hydrophobic monomers and of hydrophilic monomers, the hydrophilic monomers being present in an amount of less than 33% by weight, preferably at least 1% by weight, even more preferably between 2 and 15%, with respect to the total weight of the units of the hydrophobic block. If desired, the blocks predominantly hydrophobic in nature are a completely hydrophobic blocks.

In addition, the blocks water-soluble in nature may come from the copolymerization of hydrophilic monomers and of hydrophobic monomers, the hydrophobic monomers being present in an amount of less than 70% by weight, preferably at least 1% by weight, even more preferably between 50 and 10%, with respect to the total weight of the units of the water-soluble block.

According to a second version of the preparation of the water soluble block copolymers, the blocks water-soluble in nature may come from the polymerization of monomers that may be rendered hydrophilic by hydrolysis and optionally of non-hydrolysable hydrophobic monomers and/or of hydrophilic monomers, and then from the hydrolysis of the polymer obtained. During the hydrolysis, the units corresponding to the hydrolysable monomers are hydrolyzed into hydrophilic units. The amounts of hydrophilic and hydrophobic units in each of the blocks are then controlled by the amount of each type of monomer and by the degree of hydrolysis. According to this second version, various methods of implementation may be envisaged.

According to a first method of implementation, the blocks may be obtained by: homopolymerization of hydrophobic monomers that can be rendered hydrophilic by hydrolysis and partial hydrolysis of the homopolymer obtained to a degree such that what is obtained is: either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block, or, in the case of the blocks water-soluble in nature, an amount of hydrophobic units of less than 70% by weight, preferably at least 1% by weight, even more preferably between 25 and 50%, with respect to the total weight of the units of the water-soluble block.

According to a second method of implementation, the blocks may be obtained by: copolymerization of hydrophobic monomers that can be rendered hydrophilic by hydrolysis and of hydrophobic monomers that cannot be rendered hydrophilic by hydrolysis and then complete or partial hydrolysis of the polymer obtained. According to this second method of implementation, the amount of hydrophilic and hydrophobic units may depend on two criteria, namely the content of the various types of monomers and the degree of hydrolysis.

If there is complete hydrolysis, then it is sufficient to vary the content of the monomers and thus:

the blocks predominantly hydrophobic in nature can come: from the polymerization of a mixture of hydrophobic monomers that can be rendered hydrophilic by hydrolysis and of hydrophobic monomers that cannot be rendered hydrophilic by hydrolysis, the hydrophobic monomers that can be rendered hydrophilic by hydrolysis being present in an amount of less than 33% by weight, preferably at least 1% by weight, even more preferably between 2 and 15%, with respect to the total weight of the units of the hydrophobic block, and then, from the complete hydrolysis of the polymer obtained;

the blocks water-soluble in nature may come: from the polymerization of a mixture of hydrophobic monomers that can be rendered hydrophilic by hydrolysis and of hydrophobic monomers that cannot be rendered hydrophilic by hydrolysis, the hydrophobic monomers that cannot be rendered hydrophilic by hydrolysis being present in an amount of less than 50% by weight, preferably at least 1% by weight, even more preferably between 49 and 10%, with respect to the total weight of the units of the hydrophobic block, and then from the complete hydrolysis of the polymer obtained.

If there is partial hydrolysis, the monomer content and the degree of hydrolysis may be varied at the same time.

According to a third method of implementation, the blocks may be obtained by:

copolymerization of hydrophobic monomers that can be rendered hydrophilic by hydrolysis and of hydrophilic monomers and then partial hydrolysis of the polymer obtained to a degree such that what is obtained is:

either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block, or, in the case of the blocks water-soluble in nature, an amount of hydrophobic units of less than 70% by weight, preferably at least 1% by weight, even more preferably between 50 and 10%, with respect to the total weight of the units of the water-soluble block.

In general, the hydrophobic monomers may be chosen from: vinylaromatic monomers, such as styrene, dienes, such as butadiene, alkyl acrylates and methacrylates the alkyl group of which contains from 1 to 10 carbon atoms, such as methyl, ethyl, n-butyl, 2-ethylhexyl, tert-butyl, isobornyl, phenyl and benzyl acrylates and methacrylates. Preferably, it is styrene.

The hydrophilic monomers may be chosen from: ethylenically unsaturated carboxylic acids such as acrylic and methacrylic acids; neutral hydrophilic monomers such as acrylamide and its derivatives (N-methylacrylamide, N-isopropylacrylamide), methacrylamide, polyethylene glycol methacrylate and polyethylene glycol acrylate; anionic hydrophilic monomers: sodium 2-acrylamido-2-methylpropanesulphonate (SAMPS), sodium styrenesulphonate and sodium vinylsulphonate.

The monomers that can be rendered hydrophilic by hydrolysis may be chosen from: acrylic and methacrylic esters hydrolysable in acid, such as methyl acrylate, ethyl acrylate, hydroxyethyl methacrylate, hydroxyethyl acrylate and tert-butyl acrylate; vinyl acetate hydrolysable into vinyl alcohol units; quaternized 2-dimethylaminoethyl methacrylate and acrylate (quatdamma and quatdama); acrylamide and (meth)acrylamide.

Preferably, the block copolymers according to the invention are diblock copolymers. However, they may also be triblock, or even multiblock copolymers. For example, the block copolymers may be a triblock copolymer having a block water-soluble in nature flanked by two blocks predominantly hydrophobic in nature, or a triblock copolymer having a block predominantly hydrophobic in nature flanked by two blocks water-soluble in nature. If the copolymer comprises three blocks, it is preferable to have a block water-soluble in nature flanked by two blocks predominantly hydrophobic in nature.

According to a particular embodiment, the copolymer is a diblock copolymer comprising a block water-soluble in nature and a block predominantly hydrophobic in nature, in which: the block water-soluble in nature contains acrylic acid (AA) units and ethyl acrylate (EtA) units and the block predominantly hydrophobic in nature contains styrene (St) units and methacrylic acid (MAA) and/or hydroxyethyl methacrylate (HEMA) units.

Preferably, according to this embodiment, the block water-soluble in nature comes: from the polymerization of methacrylic acid (MAA) and of ethyl acrylate (EtA) in an EtA/MAA weight ratio from 90/10 to 99/1, and then from the hydrolysis of the polymer obtained to a degree of at least 50 mol % up to 95%.

Preferably, the block predominantly hydrophobic in nature comes from the polymerization of a monomer mixture comprising at least 80% by weight styrene.

Generally, the block copolymers according to the invention have a molecular mass of at most 200,000 g/mol, for example at most 100,000 g/mol, preferably at least 5000 g/mol.

In general, the above block copolymers can be obtained by any so-called living or controlled polymerization process such as, for example:
radical polymerization controlled by xanthates according to the teaching of Application WO 98/58974,
radical polymerization controlled by dithioesters according to the teaching of Application WO 97/01478,
polymerization using nitroxide precursors according to the teaching of Application WO 99/03894,
radical polymerization controlled by dithiocarbamates according to the teaching of Application WO 99/31144,
atom transfer radical polymerization (ATRP) according to the teaching of Application WO 96/30421,
radical polymerization controlled by iniferters according to the teaching of Otu et al., Makromol. Chem. Rapid. Commun., 3, 127 (1982),
radical polymerization controlled by degenerative iodine transfer according to the teaching of Tatemoto et al., Jap. 50, 127, 991 (1975), Daikin Kogyo Co Ltd., Japan and Matyjaszewski et al., Macromolecules, 28, 2093 (1995),
group transfer polymerization according to the teaching of O. W. Webster "Group Transfer Polymerization", pp. 580-588 in "Encyclopedia of Polymer Science and Engineering", vol. 7 and H. F. Mark, N. M. Bikales, C. G. Overberger and G. Menges, Publ., Wiley Interscience, New York, 1987,
radical polymerization controlled by tetraphenylethane derivatives (D. Braun et al., Macromol. Symp. 111, 63 (1996)), and
radical polymerization controlled by organocobalt complexes (Wayland et al., J. Am. Chem. Soc. 116, 7973 (1994)).

The preferred polymerization is living radical polymerization using xanthates.

II. Nonionic Surfactants

The surfactant of the composition of the present invention may comprise from 0.1 wt % to 10 wt %, preferably 0.1 wt. % to 2 wt %, nonionic surfactant or mixtures thereof provided at least one of the nonionic surfactants has a hydrophilic-lipophilic balance (H LB) of less than 12, and preferably from 2 to 10. A typical HLB is 4 to 7 or 5 to 6.

The nonionic surfactants are a known class of compounds having many members, any of which can be used herein. This class of compounds is illustrated, for example, in the handbook of McCutcheons, Combined Edition (published by McCutcheons' Division, MC Publishing Company, Glen Rock, N.J.). Any mixture of these nonionic surfactants may be employed provided at least one of the nonionic surfactants has a hydrophile-lipophile balance of less than 12.

Nonionic surfactants which can be used include those broadly defined as compounds produced by the condensation of alkylene oxide groups (hydrophilic in nature) with an organic hydrophobic compound, which may be aliphatic or alkyl aromatic in nature. Examples of typical classes of nonionic surfactants are:

1. The polyethylene oxide condensates of alkyl phenols, e.g., the condensation products of alkyl phenols having an alkyl group containing from about 6 to about 20 carbon atoms in either a straight chain or branched chain configuration, with ethylene oxide, the ethylene oxide being present in amounts equal to from about 1 to about 10 moles of ethylene oxide per mole of alkyl phenol. The alkyl substituent in such compounds may be derived from polymerized propylene, diisobutylene, octane, or nonane, for example.

2. The condensation product of the condensation of ethylene oxide with the product resulting from the reaction of propylene oxide and ethylene diamine products which may be varied in composition depending upon the balance between the hydrophobic and hydrophilic elements which is desired. For example, compounds containing from about 5% to about 50% polyoxyethylene by weight and having a molecular weight of from about 5,000 to about 11,000 resulting from the reaction of ethylene oxide groups with a hydrophobic base constituted of the reaction product of ethylene diamine and excess propylene oxide, the base having a molecular weight of the order of about 2,500 to about 3,000, are satisfactory.

3. The condensation product of aliphatic alcohols having from about 8 to about 18 carbon atoms, in either straight chain or branched chain configuration, with ethylene oxide, e.g., a coconut alcohol ethylene oxide condensate having from about 1 to about 10 moles of ethylene oxide per mole of coconut alcohol, the coconut alcohol fraction having from about 10 to about 14 carbon atoms.

4. Long chain tertiary amine oxides corresponding to the following general formula I:

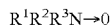   I wherein $R^1$ contains an alkyl, alkenyl or monohydroxy alkyl radical of from about 8 to about 18 carbon atoms, from 1 to about 10 ethylene oxide moieties, and from 0 to about 1 glyceryl moiety, and $R^2$ and $R^3$ contain from about 1 to about 3 carbon atoms and from 0 to about 1 hydroxy group, e.g., methyl, ethyl, propyl, hydroxyethyl, or hydroxypropyl radicals. The arrow in the formula is a conventional representation of a semipolar bond. Examples of amine oxides suitable for use in this invention include dimethyldodecylamine oxide, oleyl-di(2-hydroxyethyl) amine oxide, dimethyloctylamine oxide, dimethyl-decylamine oxide, dimethyl-tetradecylamine oxide, 3,6,9-trioxaheptadecyldiethylamine oxide, di(2hydroxyethyl)-tetradecylamine oxide, 2-dodecoxyethyldimethylamine oxide, 3-dodecoxy-2-hydroxypropyldi(3-hydroxypropyl) amine oxide, dimethylhexadecylamine oxide.

5. Long chain tertiary phosphine oxides corresponding to the following general formula II:

   II wherein R contains an alkyl, alkenyl or monohydroxyalkyl radical ranging from about 8 to about 18 carbon atoms in chain length, from 1 to about 10 ethylene oxide moieties and from 0 to about 1 glyceryl moiety and R' and R" are each alkyl or monohydroxyalkyl groups containing from about 1 to about 3 carbon atoms. The arrow in the formula is a conventional representation of a semipolar bond. Examples of suitable phosphine oxides are: dodecyldimethylphosphine oxide, tetradecyldimethylphosphine oxide, tetradecylmethylethylphosphine oxide. 3,6,9,-trioxaoctadecyldimethylphosphine oxide, cetyldimethylphosphine oxide, 3-dodecoxy-2-hydroxypropyldi (2-hydroxyethyl) phosphine oxide, stearyldimethylphosphine oxide, cetylethylpropylphosphine oxide, oleyldiethylphosphine oxide, dodecyldiethylphosphine oxide, tetradecyldiethylphosphine oxide, dodecyldipropylphosphine oxide, dodecyldi(hydroxymethyl)phosphine oxide, dodecyldi(2-hydroxyethyl)phosphine oxide, tetradecylmethyl-2-hydroxypropylphosphine oxide, oleydimethylphosphine oxide, 2-hydroxydodecyldimethylphosphine oxide.

6. Long chain dialkyl sulfoxides containing one short chain alkyl or hydroxy alkyl radical of from about 1 to about 3 carbon atoms (usually methyl) and one long hydrophobic chain which include alkyl, alkenyl, hydroxy alkyl, or keto alkyl radicals containing from about 8 to about 20 carbon atoms, from 0 to about 10 ethylene oxide moieties and from 0 to about 1 glyceryl moiety. Examples include: octadecyl methyl sulfoxide, 2-ketotridecyl methyl sulfoxide, 3,6,9,-trixaoctadecyl 2-hydroxyethyl sulfoxide, dodecyl methyl sulfoxide, oleyl 3-hydroxypropyl sulfoxide, tetradecyl methyl sulfoxide, 3-methoxytridecyl methyl sulfoxide, 3-hydroxytridecyl methyl sulfoxide, 3-hydroxy-4-dodecoxybutyl methyl sulfoxide.

Typical nonionic surfactants are selected from the group consisting of octylphenol ethoxylates, nonylphenol ethyoxylates, dodecyl phenol ethoxylates, dinonyl phenol ethoxylates, tristyrylphenol ethoxylates, isotridecyl alcohol ethoxylates, oleyl alcohol ethoxylates, mercaptan ethoxylates, sorbitol esters, ethoxylated sorbitol esters, polyethylene glycol (PEG) esters, PEG phosphate esters, ethocylated acids, alcohol esters, glycerol esters, glycol esters, diethanolamides, monoethanolamdies, alabolamides and mixtures thereof provided at least one of the nonionic surfactants has a hydrophile-lipophile balance (HLB) of less than 12, preferably an HLB of 2 to 10.

The nonionic surfactants are prepared in many instances by reacting ethylene oxide with a compound having active hydrogen and are referred to as "ethoxylated" compounds. For example, nonionic surfactants have been prepared by reacting ethylene oxide with alcohols, amides, alkylated-phenols, etc. Preferred nonionic surfactants are ethoxylated aliphatic alcohols, and most preferred are ethoxylated alkanols having from 8 to 24 carbon atoms in the alkanol moiety.

III. Inorganic Salts

Monovalent electrolytes have a typical formula $A^+B^-$, wherein A is selected from the group consisting of sodium, potassium or other alkali metals and B is selected from the group consisting of chloride, bromide or other halogens.

Divalent electrolytes have a typical formula $A_a^{+X}B_b^{-Y}$, wherein A is selected from the group consisting of calcium, magnesium, ferric and B is selected from the group consisting of chloride, bromide, sulfate, carbonate, nitrate, a times X is +2 and b times Y is -2.

Trivalent electrolytes have a typical formula $A_a^{+X}B_b^{-Y}$, wherein A is selected from the group consisting of ferric (Fe3+) and B is selected from the group consisting of chloride, bromide, sulfate, carbonate, nitrate, wherein a times X is +3 and b times Y is -3.

Suitable inorganic mono- and/or di-valent electrolytes include sodium sulfate, sodium nitrate, sodium chloride (which is preferable due to its availability and cost), sodium tripolyphosphate, sodium carbonate, magnesium chloride or potassium chloride, etc. but the monovalent metallic salts, particularly sodium chloride are preferred. The inorganic salts are present in the water in an amount within the range of about 250 to 100,000, more preferably 500 to 40,000, and still more preferably 5000 to 25,000 parts per million total dissolved solids. Other electrolytes may also be present in combination with the sodium chloride.

IV. Aqueous Medium

The aqueous medium of the composition may be soft water, brackish water or brine. Typically the aqueous medium in compositions used to treat subterranean formations comprises brine. When brine is employed it may also serve as the source of the mono- and/or di-valent ions.

V. Other Ingredients

It should be also understood that the compositions of the invention may contain components in addition to water, water soluble polymer, and at least one member of the group consisting of nonionic surfactants. Such additional components are, for example, co-solvents, acids, bases, buffers, chelating agents for the control of multivalent cations, freezing point depressants, etc.

For example, a hydrocarbon recovery composition including water, water soluble polymer, and at least one member of the group of nonionic surfactants according to the present invention may be provided to the hydrocarbon containing formation alone or with other compounds for enhancing oil recovery. For example, these other compounds may be other nonionic additives (e.g., alcohols, ethoxylated alcohols and/or sugar based esters) and less than 0.3 weight percent of one or more anionic surfactants (e.g. sulfates, sulfonates, ethoxylated sulfates, and/or phosphates). Typically the composition has less than 0.3 wt % each of anionic surfactant, amphoteric surfactant and zwitterionic surfactant. If desired, there may be an absence of anionic surfactant, an absence of amphoteric surfactant, and an absence of zwitterionic surfactant.

A. Alcohol

Alcohol can be used as mutual solvent to reduce water saturation. The interfacial tension between oil and ethanol is much lower than between oil and brine.

Capillary forces of retention for the alcohol are much reduced compared to those for brine.

It has been reported that isopropyl or butyl alcohol plus methyl alcohol could be used in miscible displacement to increase oil recovery of naphtha and mineral oil.

Others have investigated enhanced oil recovery by alcohol flooding. Their process design was strongly guided by the ternary phase of alcohol/oil/brine. They showed that oil recovery was highly dependent on the choice of alcohol/oil/brine combinations. Others have reported that injection of appropriate combinations of oil-soluble and water-soluble solvents such as alcohols and ketones could significantly enhance oil recovery.

In an embodiment, an aliphatic nonionic additive, such as an aliphatic alcohol, may be used in a hydrocarbon recovery composition. As used herein, the term "aliphatic" refers to a straight or branched chain of carbon and hydrogen atoms. In some embodiments, an aliphatic portion of an aliphatic nonionic additive may have an average carbon number from 4 to 24. In some embodiments, an aliphatic portion of an aliphatic nonionic additive may have an average carbon number from 12 to 18. In some embodiments, the aliphatic nonionic additive may include a branched aliphatic portion. A branched aliphatic portion of an aliphatic nonionic additive may have an average carbon number from 16 to 17. In some embodiments, a branched aliphatic group of an aliphatic nonionic additive may have less than about 0.5 percent aliphatic quaternary carbon atoms. In an embodiment, an average number of branches per aliphatic nonionic additive ranges from about 0.1 to about 2.5. In other embodiments, an average number of branches per aliphatic nonionic additive ranges from about 0.7 to about 2.5.

Methyl branches may represent between about 20 percent to about 99 percent of the total number of branches present in the branched nonionic additive. In some embodiments, methyl branches may represent greater than about 50 percent of the total number of branches in a branched nonionic additive. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

In an embodiment, an aliphatic nonionic additive may be a long chain aliphatic alcohol. The term "long chain," as used herein, refers to a carbon chain having an average carbon number from 10 to 30. A long chain aliphatic alcohol (e.g., a long chain primary alcohol) may be purchased commercially (e.g., NEODOL® alcohols manufactured by Shell Chemical Co., Houston, Tex.). In certain embodiments, a long chain aliphatic alcohol may be prepared by a variety of generally known methods. A long chain aliphatic alcohol may have an average carbon number from 10 to 24. In some embodiments, a long chain aliphatic alcohol may have an average carbon number from 12 to 18. In other embodiments, a long chain aliphatic alcohol may have an average carbon number from 16 to 17.

In an embodiment, a portion of the long chain aliphatic alcohol may be branched. Branched long chain aliphatic alcohols may be prepared by hydroformylation of a branched olefin. Preparations of branched olefins are described in U.S. Pat. No. 5,510,306 to Murray, entitled "Process For Isomerizing Linear Olefins to Isoolefins;" U.S. Pat. No. 5,648,584 to Murray, entitled "Process For Isomerizing Linear Olefins to Isoolefins" and U.S. Pat. No. 5,648,585 to Murray, entitled "Process For Isomerizing Linear Olefins to Isoolefins," all of which are incorporated by reference herein. Preparations of branched long chain aliphatic alcohols are described in U.S. Pat. No. 5,849,960 to Singleton et al., entitled "Highly Branched Primary Alcohol Compositions, and Biodegradable Detergents Made Therefrom;" U.S. Pat. No. 6,150,222 to Singleton et al., entitled "Highly Branched Primary Alcohol Compositions, and Biodegradable Detergents Made Therefrom;" U.S. Pat. No. 6,222,077 to Singleton et al., entitled "Highly Branched Primary Alcohol Compositions, and Biodegradable Detergents Made Therefrom," all of which are incorporated by reference herein.

In some embodiments, branches of a branched aliphatic group of a long chain aliphatic alcohol may have less than about 0.5 percent aliphatic quaternary carbon atoms. In an embodiment, an average number of branches per long chain aliphatic alcohol ranges from about 0.1 to about 2.5. In other embodiments, an average number of branches per alcohol ranges from about 0.7 to about 2.5.

Methyl branches may represent between about 20 percent to about 99 percent of the total number of branches present in the branched long chain aliphatic alcohol. In some embodiments, methyl branches may represent greater than about 50 percent of the total number of branches in a branched long chain aliphatic alcohol. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

B. Aliphatic Anionic Surfactants

At most small amounts of an aliphatic anionic surfactant may be used in a hydrocarbon recovery composition. In certain embodiments, an aliphatic portion of an aliphatic anionic surfactant may have an average carbon number from 10 to 24. In some embodiments, an aliphatic portion of an aliphatic anionic surfactant may have an average carbon number from 12 to 18. In other embodiments, an aliphatic portion of an aliphatic anionic surfactant may have an average carbon number from 16 to 17. In some embodiments, the aliphatic anionic surfactant may include a branched aliphatic portion. In some embodiments, a branched aliphatic group of an aliphatic anionic surfactant may have less than about 0.5 percent aliphatic quaternary carbon atoms. In an embodiment, an average number of branches per aliphatic anionic surfactant ranges from about 0.1 to about 2.5. In other embodiments, an average number of branches per aliphatic anionic surfactant ranges from about 0.7 to about 2.5.

Methyl branches may represent between about 20 percent to about 99 percent of the total number of branches present in the branched anionic surfactant. In some embodiments, methyl branches may represent greater than about 50 percent of the total number of branches in a branched anionic surfactant. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

In an embodiment which further employs aliphatic anionic surfactant, a solution may provided which contains an effective amount of an aliphatic anionic surfactant selected from the group of compounds having the general formula: $R_1O(C_3H_6O)_m(C_2H_4O)_nYX$ wherein $R_1$ is a linear or branched alkyl radical, an alkenyl radical, or an alkyl or alkenyl substituted benzene radical, the non-aromatic portion of the radical containing from 6 to 24 carbon atoms; m has an average value of from 1 to 10; n has an average value of from 1 to 10; Y is a hydrophilic group; and X is a cation, preferably monovalent, for example $Na^+$, $K^+$, $NH_4^+$. Y is a suitable hydrophilic group or substituted hydrophilic group such as, for example, the sulfate, sulfonate, phosphonate, phosphate or carboxylate radical. Preferably, $R_1$ is a branched alkyl radical having at least two branching groups and Y is a sulfonate, carboxylate or phosphate group.

C. Other Optional Additives

The aqueous fluid of the present invention may, optionally, further comprise clay stabilization or sand stabilization material. During oil recovery processes, sands and other materials may become entrained in the recovered oil. This may be mitigated by the addition of a clay stabilization or sand stabilization material. Suitable clay stabilization or sand stabilization materials include epoxy resins, polyfunctional cationic polymers, such as poly(N-acrylamidomethyltriethyl ammonium chloride) or poly(vinylbenzyltrimethyl ammonium chloride).

Other optional ingredients that may be added to the aqueous fluid of the present invention include, but are not limited to polymers such as biopolysaccharides, cellulose ethers, acrylamide-derived polymers, corrosion inhibitors, oxygen scavengers, bactericides, and so forth, and any combination thereof.

VI. Methods of Use

The aqueous fluid of the present invention is introduced into the crude oil-bearing formation, typically by injecting the fluid into the formation.

The aqueous fluid may be used in secondary or tertiary oil recovery processes, although the use of such fluids in other applications is also not excluded.

A. Hydraulic Fracturing

In hydraulic fracturing the fracturing fluid comprising water soluble polymer and at least one nonionic surfactant is pumped into the targeted formation at a rate in excess of what can be dissipated through the natural permeability of the formation rock. The fracturing fluids result in a pressure build up until such pressure exceeds the strength of the formation rock. When this occurs, the formation rock fails and a so-called "fracture" is initiated. With continued pumping, the fracture grows in length, width and height.

At a predetermined time in the pumping process, solid particulate is typically added to the fluid that is being pumped. This particulate is carried down the well, out of the wellbore and deposited in the created fracture. It is the purpose of this specially designed particulate to keep the fracture from "healing" to its initial position (after pumping has ceased). The particulate is said to be propping open the fracture and is therefore designated as "proppant". The fracture, which is generated by the application of this stimulation technique, creates a conductive path to the wellbore for the hydrocarbon.

Typical proppant is selected from the group consisting of gravel, quartz sand grains, sintered bauxite, glass and ceramic beads, walnut shell fragments, or aluminum pellets. The fracturing fluid may also include a thermal stabilizer, for example sodium thiosulfate, methanol, ethylene glycol, isopropanol, thiourea, and/or sodium thiosulfite. The fracturing fluid may also include KCl as a clay stabilizer.

B. Chemical Flooding

Aqueous medium, such as soft water, brackish water, or a brine, can be utilized in the solution including the mixture of water soluble polymer and at least one member of the group consisting of nonionic surfactants of the invention.

Optionally, after injection of the aqueous fluid comprising the present mixture of water soluble polymer and at least one nonionic surfactant of the present invention, in addition to crude oil having generally the viscosity of the oil-bearing formation of the oil well to be treated, various hydrocarbon solvents may be employed to displace the aqueous solution out into the reservoir. Hydrocarbon solvents such as the low molecular weight, generally liquid hydrocarbons boiling below the gasoline range, such as the lower alkanes including butane, propane, pentane, hexane and heptane, as well as natural gasoline, petroleum naphtha and kerosene or mixtures of these hydrocarbons, are useful. Both sweet and sour crude oil is useful as a hydrocarbon to displace the aqueous solution out into the subterranean reservoir of oil or gas.

Optionally, injection of a preflush fluid may be utilized prior to injection of the aqueous fluid of the present invention. The preflush may consist of a hydrocarbon fluid, a brine solution, or simply water.

Also, injection of the aqueous fluid composition of the present invention may optionally be followed by an injection of a surfactant.

This polymeric flush or mobility control fluid may once again be followed by a water flush which may be brine or saline or softened water, or fresh water.

Oil is recovered at a production well spaced apart from the injection well as the drive fluid pushes the mobility buffer slug which sweeps the oil out of the pores in the formation and to the production well. Once the water/oil emulsion reaches the surface, it is put into holding tanks where it is subsequently demulsified, thereby allowing the oil to separate from the water through the natural forces of gravity.

For example, a hydrocarbon recovery composition of the present invention may be added to a portion of hydrocarbon containing formation that may have an average temperature of more than 50° C. and preferentially more than 70° C. To facilitate delivery of an amount of the hydrocarbon recovery composition to the hydrocarbon containing formation, the hydrocarbon recovery composition may be combined with water or brine to produce an injectable fluid. Typically about 0.1 to about 3 wt % of the water soluble polymer and about 0.08 to about 3 wt % of the nonionic surfactant, based on the total weight of injectable fluid, may be injected into the hydrocarbon containing formation through an injection well.

In certain embodiments, the concentration of the hydrocarbon recovery composition injected through the injection well may be about 0.1 to about 10 wt % of the water soluble polymer and about 0.01 to about 10 wt % of the nonionic surfactant, based on the total weight of injectable fluid. In some embodiments, the concentration of the hydrocarbon recovery composition may be about 0.3 to about 3 wt % water soluble polymer, about 0.08 to about 3 wt % nonionic surfactant, and 0.1 to 20 wt. % inorganic salt based on the total weight of injectable fluid.

In some embodiments, a hydrocarbon recovery composition may be added to a portion of a hydrocarbon containing formation.

C. Other Methods of Use

Some other uses of the composition of the present invention include, thickening agents for home care products, liquid laundry detergents, drain cleaners, hard surface cleaners, automatic dishwasher fluids, fracturing fluids in oil and gas fields, thickening hair gels, gel deodorant, and other personal care applications, as well as a fluid loss agent in cement applications. It targets more precisely the improvement of electrolytic stability of polymeric solutions.

EXAMPLES

It is well known that the presence of salt breaks down the viscosity of polyelectrolytes. Thus, a first example tested if a nonionic surfactant could protect a PS-b-(EA-co-AA) diblock that is 70% hydrolyzed. The diblock was 3k polystyrene 30K EA-co-AA (30K ethylene acetate-co-acrylic acid).

A solution of water soluble polymer was diluted to the required value in water and mixed with high speed homogenizer (ULTRA TURRAX T-25) at a speed of 20000 rpm. The resulting viscosity and viscoelasticity were measured in an AR-G2 rheometer (TA instruments) with a 4 degree 40 mm cone and plate geometry. Electrolytes were added (typically 10 wt % KCl for these examples), mixed with high speed homogenizer and the resulting viscosity and viscoelasticity were measured. Nonionic surfactant additives were added and mixed with high speed homogenizer and the resulting viscosity was measured.

Figure 2:
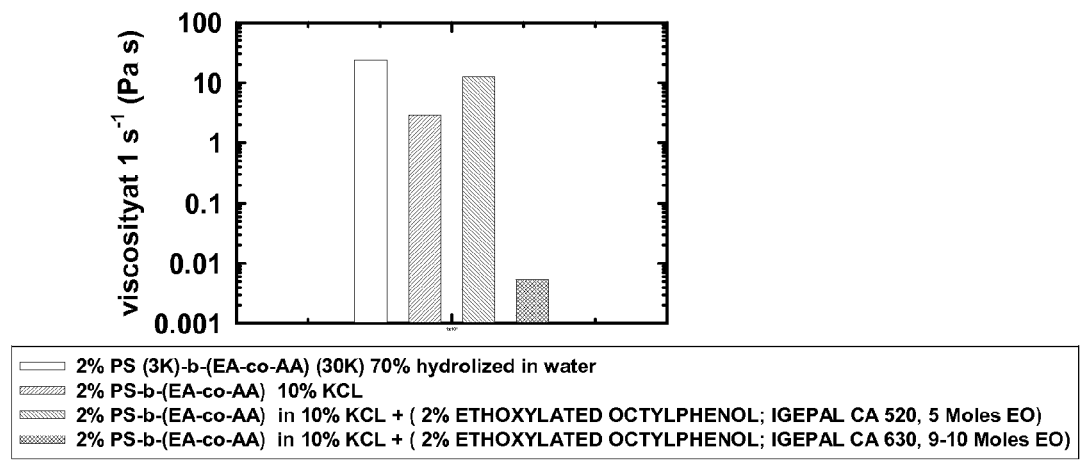
FIG. 2 shows the viscosity at 1 s$^{-1}$.

The viscoelasticity is built through the hydrophobic association of the ethyl acrylate (EA). This example used a small amount of nonionic surfactant to protect the chain and the associations from the presence of salt. FIG. 1 and FIG. 2 show the viscosity as a function of shear rate for a 2% diblock solution in 10% KCl, at 2 wt % ethoxylated octylphenol nonionic surfactant.

In FIG. 1 PSPAA is PS-b-(EA-co-AA) diblock. The nonionic surfactants tested were IGEPAL CA 520 (HLB=10) and IGEPAL CA 630 (HLB=13) ethoxylated octylphenol nonionic surfactants available from Rhodia Inc., Cranbury, N.J. Remarkably, this example showed the viscoelasticity can be recovered through the addition of the IGEPAL CA 520 surfactant.

It is apparent that embodiments other than those expressly described above come within the spirit and scope of the present claims. Thus, the present invention is not defined by the above description, but rather is defined by the claims appended hereto.

The invention claimed is:

1. An aqueous solution composition comprising a mixture of:
water,
about 0.05 to 10 weight % on a wet basis at least one water soluble block copolymer water-soluble in nature and containing hydrophobic units and at least one block predominantly hydrophobic in nature,
about 0.01 to 10 weight % on a wet basis a nonionic surfactant having a hydrophilic-lipophilic balance of less than 12, and
about 0.1 to 20 weight % on a wet basis at least one inorganic salt selected from the group consisting of mono-valent ions, di-valent ions and tri-valent ions.

2. The composition according to claim 1, wherein the predominantly hydrophobic block has hydrophilic units in an amount equal to between 0 and less than 33% by weight, with respect to the total weight of the units of the hydrophobic block.

3. The composition according to claim 1, wherein the block polymer water-soluble in nature has hydrophobic units in an amount of less than 70% by weight with respect to the total weight of the units of the block water-soluble in nature.

4. The composition according to claim 1, wherein the block predominantly hydrophobic in nature comes from the polymerization of a monomer mixture containing at least 80% by weight styrene.

5. The composition according to claim 1, wherein the mass ratio of the blocks predominantly hydrophilic in nature to the blocks predominantly hydrophobic in nature is between 95/5 and 20/80.

6. The composition according to claim 1, wherein the copolymer is at a concentration of between 0.1% and 10% by weight.

7. The composition according to claim 1, wherein the nonionic surfactant has a hydrophilic-lipophilic balance of 2 to 10.

8. The composition according to claim 1, wherein the nonionic surfactant is at a concentration of between 0.06% and 5% by weight.

9. The composition according to claim 1, wherein the nonionic surfactant is selected from the group consisting of:
polyethylene oxide condensates of alkyl phenols,
condensation products from the condensation of ethylene oxide with the product resulting from the reaction of propylene oxide and ethylene diamine products,
condensation products of aliphatic alcohols having from about 8 to about 18 carbon atoms,
long chain tertiary amine oxides corresponding to the following general formula I:

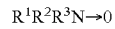   I wherein $R^1$ contains an alkyl, alkenyl or monohydroxy alkyl radical of from about 8 to about 18 carbon atoms, from 0 to about 10 ethylene oxide moieties, and from 0 to about 1 glyceryl moiety, and $R^2$ and $R^3$ contain from about 1 to about 3 carbon atoms and from 0 to about 1 hydroxy group, e.g., methyl, ethyl, propyl, hydroxyethyl, or hydroxypropyl radicals;

long chain tertiary phosphine oxides corresponding to the following general formula II:

   II wherein R contains an alkyl, alkenyl or monohydroxyalkyl radical ranging from about 8 to about 18 carbon atoms in chain length, from 0 to about 10 ethylene oxide moieties and from 0 to about 1 glyceryl moiety and R' and R'' are each alkyl or monohydroxyalkyl groups containing from about 1 to about 3 carbon atoms;

long chain dialkyl sulfoxides containing one short chain alkyl or hydroxy alkyl radical of from about 1 to about 3 carbon atoms (usually methyl) and one long hydrophobic chain which include alkyl, alkenyl, hydroxy alkyl, or keto alkyl radicals containing from about 8 to about 20 carbon atoms, from 0 to about 10 ethylene oxide moieties and from 0 to about 1 glyceryl moiety; and mixtures thereof.

10. The composition according to claim 1, wherein the nonionic surfactant is selected from the group consisting of octylphenol ethoxylates, nonylphenol ethyoxylates, dodecyl phenol ethoxylates, dinonyl phenol ethoxylates, tristyrylphenol ethoxylates, isotridecyl alcohol ethoxylates, oleyl alcohol ethoxylates, mercaptan ethoxylates, sorbitol esters, ethoxylated sorbitol esters, polyethylene glycol (PEG) esters, PEG phosphate esters, ethocylated acids, alcohol esters, glycerol esters, glycol esters, diethanolamides, monoethanolamdies, alabolamides and mixtures thereof.

11. The composition according to claim 1, wherein the composition comprises brine.

12. The composition according to claim 1, wherein the aqueous solution composition is a gel.

13. A hydraulic fracturing fluid comprising the aqueous solution composition of claim 1, and a proppant.

14. A method for recovering hydrocarbons from a subterranean formation, comprising introducing to the formation an aqueous fluid comprising the composition of claim 1.

15. A method to create fissures into a subterranean formation which surrounds a well bore, comprising the step of injecting into the bore a fracturing fluid comprising a composition as defined in claim 1.

* * * * *